United States Patent [19]

Sachs et al.

[11] 4,352,023
[45] Sep. 28, 1982

[54] MECHANISM FOR GENERATING POWER FROM WAVE MOTION ON A BODY OF WATER

[76] Inventors: Herbert K. Sachs, 2551 Ivanhoe Dr., Orchard Lake, Mich. 48033; George A. Sachs, 1845 Woodland, Sylvan Lake, Mich. 48053

[21] Appl. No.: 223,120

[22] Filed: Jan. 7, 1981

[51] Int. Cl.³ .................... F03B 13/12; H02P 9/04
[52] U.S. Cl. ............................... 290/42; 60/499; 60/506; 60/507; 290/53
[58] Field of Search ................ 60/495, 497, 499–501, 60/505–507; 290/42, 53; 417/330–333

[56] References Cited

U.S. PATENT DOCUMENTS

| | | | |
|---|---|---|---|
| 937,712 | 10/1909 | McFarland | 60/501 |
| 974,501 | 11/1910 | Farmer | 60/501 |
| 1,423,115 | 7/1922 | Hultberg | 60/506 |
| 2,928,967 | 12/1975 | Salter | 60/398 |
| 3,231,749 | 1/1966 | Hinck | 290/53 |
| 3,818,704 | 6/1974 | Lapeyre | 60/504 |
| 3,965,365 | 6/1976 | Parr | 290/53 |
| 4,034,565 | 7/1977 | McVeigh | 60/503 |
| 4,122,676 | 10/1978 | Kikut | 60/398 |
| 4,145,885 | 3/1979 | Solell | 290/53 |
| 4,208,875 | 6/1980 | Tsubota | 60/495 |
| 4,208,876 | 6/1980 | Tsubota | 60/495 |
| 4,210,821 | 7/1980 | Cockerell | 290/53 |

OTHER PUBLICATIONS

John D. Isaacs et al., "Utilization of the Energy in Ocean Wavers", vol. 3, pp. 175–187, Pergamon Press, 1976.

"Vibrating Devices Harnesses Wasted Energy to Give Useful Rotary Motion", Product Engineering, May, 1974.

Primary Examiner—Gene Z. Rubinson
Assistant Examiner—Shelley Wade
Attorney, Agent, or Firm—Basile, Weintraub & Hanlon

[57] ABSTRACT

A mechanism for generating power from wave motion on a body of water. The mechanism includes a buoyant body which is adapted to float on a body of water and to roll and pitch in response to the wave motion of the water. A gyro-wave energy transducer is mounted on the buoyant body for translating the pendulum-like motions of the buoyant body into rotational motion. The gyro-wave energy transducer includes a gimbal comprised of first and second frames, with the first frame being pivotally mounted to the second frame and the second frame being pivotally mounted to the buoyant body. A gyroscope is mounted to the first frame for rotation about an axis perpendicular to the axes of rotation of the first and second frames. A motor/generator is coupled to the gyroscope for maintaining a controlled rotational velocity for the gyroscope. Transferring members are associated with one of the first and second frames for transferring torque of one of the first and second frames to the gyroscope about an axis that is perpendicular to that of the gyroscope which results in rotation of the other of the first and second frames. An electrical generator is responsive to the relative rotational movement of the first and second frames for generating electrical energy. A storage battery is mounted on the buoyant body for storing and releasing electrical energy and is operatively coupled to the motor/generator and the electrical generator. A control circuit is associated with the generator and the motor/generator unit of the gyroscope and is responsive to the time rate of change of current produced by the generator for controlling the rotational velocity of the gyroscope in order to maintain maximum power output from the electrical generator.

33 Claims, 10 Drawing Figures

MECHANISM FOR GENERATING POWER FROM WAVE MOTION ON A BODY OF WATER

BACKGROUND OF THE INVENTION

1. Field of the Invention

This invention relates, in general, to an apparatus for generating power and, more specifically, to an apparatus for generating electrical power from wave motion on a body of water.

2. Description of the Prior Art

In today's energy starved world extensive efforts are being made to produce energy, and in particular to electrical power, from naturally occurring phenomena, such as power obtained from solar energy, wind energy and ocean wave energy. This latter phenomenon has generated particular interest among scientists because of the enormous total potential inherent in wave energy and, also, since waves are a continuing, non-depletable phenomenon.

Although a large variety of wave motors or devices for extracting power from wave energy have been devised in the past, the commercial use of such devices has been slow. Such prior art devices generally include valves which are responsive to the hydraulic movements of the waves and which drive piston and crank reciprocating mechanisms.

Another common type of wave energy device utilizes articulated moving parts which guide and direct the flow of water particles to propel a turbine or reciprocating motor.

Such devices suffer from several defects which, in all probability, have limited their successful commercial use. For one, the pistons, turbine wheels and numerous valve mechanisms used in such devices cause substantial energy losses which reduce the overall efficiency of such wave energy devices.

For another, the operative components of such devices are exposed to the water for their operation and thus are subject to the harsh and corrosive effects of the sea water. Thus, these devices require additional maintenance in order to maintain them in an operating condition or require the use of expensive, noncorrosive material for their construction.

Thus, it would be desirable to provide a mechanism for generating power from wave motion which overcomes the problems of similar prior art devices. It would also be desirable to provide a mechanism for generating power from wave motion in which all of the operative components, both mechanism and electrical, are protected and isolated from the corrosive effects of sea water. It would be desirable to provide a mechanism for generating power from wave motion which is capable of converting pitch, roll and heave motions of the waves into usable energy.

Finally, it would be desirable to provide a mechanism for generating power from wave energy in which internal energy losses are limited only to those commonly encountered in gear transmissions and bearings.

SUMMARY OF THE INVENTION

There is disclosed herein a unique mechanism for generating power from wave motion on a body of water. The mechanism includes a buoyant body which is adapted to float on a body of water and pivot in response to wave motion of the water. The buoyant body may be in the form of a floatable buoy having a plurality of circumferentially spaced, hydrofoil-shaped vanes which extend outward therefrom to intercept the waves. Alternately, the buoyant body may be in the shape of a large barge or floatable water craft which rolls in response to the impinging waves.

The mechanism also includes a gyro-wave energy transducer which is mounted on the buoyant body for transforming the pendulum-like motions of the buoyant body into rotational motion. The gyro-wave energy transducer includes a gimbal having first and second frames, with the first frame being pivotally mounted to the second frame for rotation about a first axis and the second frame being pivotally mounted to the buoyant body for rotation about a second axis perpendicular to the first axis of rotation of the first frame. A gyroscope is mounted to the first frame for rotation about a third axis perpendicular to the front and second axes. Means are coupled to the gyroscope for maintaining the gyroscope at a controlled rotational velocity and comprise a motor/generator unit secured to the first frame.

Means, associated with one of the first and second frames, is provided for transferring torque of one of the first and second frames to the gyroscope about an axis perpendicular to the axis of rotation of the gyroscope which results in rotational movement of the other of the first and second frames. Means, responsive to the relative rotation of the first and second frames, is operatively connected to the gimbal for generating electrical power in response to rotational movement thereof. Electrical power storage means in the form of a storage battery is connected to the generating means and the means for maintaining the rotational velocity of the gyroscope for storing and releasing electrical energy. Finally, means are provided which are responsive to the time rate of change of current produced by the generating means and are operatively coupled to the means for maintaining the rotational velocity of the gyroscope in order to maintain maximum power output from the generating means.

In a preferred embodiment, the generating means comprises first and second electrical generators. The generating means also includes first and second unidirectional coupling means which respectively couple rotational movement of the first frame in opposed directions to the respective first and second electrical generators. First and second transmission means are connected between the first and second unidirectional coupling means and the first and second generators to increase the amount of angular rotation of the first frame which is input to the respective first and second electrical generators. In this embodiment, the transferring means comprises compression springs which are attached at one end to the second frame and to the buoyant body at the other end to transmit the oscillatory motion of the buoyant body through the second frame to the first frame causing the first frame to rotate relative to the second frame.

In a second embodiment, the first and second electrical generators are operatively coupled to the second frame by means of serially connected unidirectional coupling means and transmission means. In this embodiment, the first and second electrical generators are fixedly mounted to the buoyant body. Further, the transferring means of this embodiment is in the form of torsion springs which operatively connect opposed legs of the first frame to the second frame to transmit torque and rotational movements of the first frame to the second frame causing electrical power to be generated by the generating means in response thereto.

Finally, in a third embodiment which is similar to the above described second embodiment, only a single electrical generator is utilized and is associated with one leg of the second frame. The output from the opposed unidirectional coupling means and transmission means associated with the opposed leg of the second frame is coupled to the transmission means associated with the electrical generator by means of a reversing gear and connecting or drive shaft such that oscillatory motion about any axis of the gimbal system is transmitted to the electrical generator.

The unique mechanism for generating power from wave motion occurring on a body of water described above provides several significant advantages over similar prior art wave energy devices. For one, all of the operative components of the present mechanism for generating power from wave motion, both mechanism and electrical, are completely sealed and isolated from the harsh and corrosive effects of the sea water. In this manner, less maintenance is required to keep the present mechanism in operating condition than previously required with similar prior art devices in which the operative mechanical components are directly immersed in the sea water. Further, the mechanism of the present invention is capable of converting pitch, roll and heave motions of the waves into usable energy. Previously devised wave energy devices were operative to convert only certain forms of wave motion into energy. Thus, a greater amount of the available kinetic energy of the waves may be converted into usable energy by means of the mechanism of the present invention. Further, the mechanism of the present invention is constructed such that internal energy losses are limited to those commonly encountered in gear transmissions and bearings and thereby avoids the losses encountered in design concepts which include pistons, turbine wheels and numerous valve mechanisms which yield additional and substantial energy losses. Finally, the size and number of the gyro-energy transducers of the present invention which may be incorporated into a single unit are limited only by the type of floating support or buoyant body and can be adapted to any requirement relative to location in the seas and power applications.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Throughout the following description and drawing, identical reference numbers are used to refer to the same component shown in multiple figures of the drawing.

Figure 1:
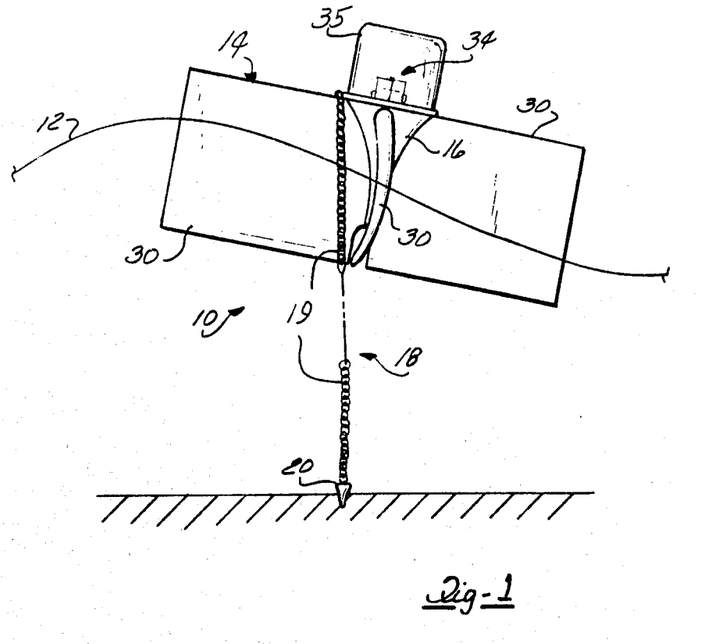
FIG. 1 is a pictorial representation of a mechanism for producing power from wave motion constructed in accordance with the teachings of one embodiment of the present invention.
Figure 2:
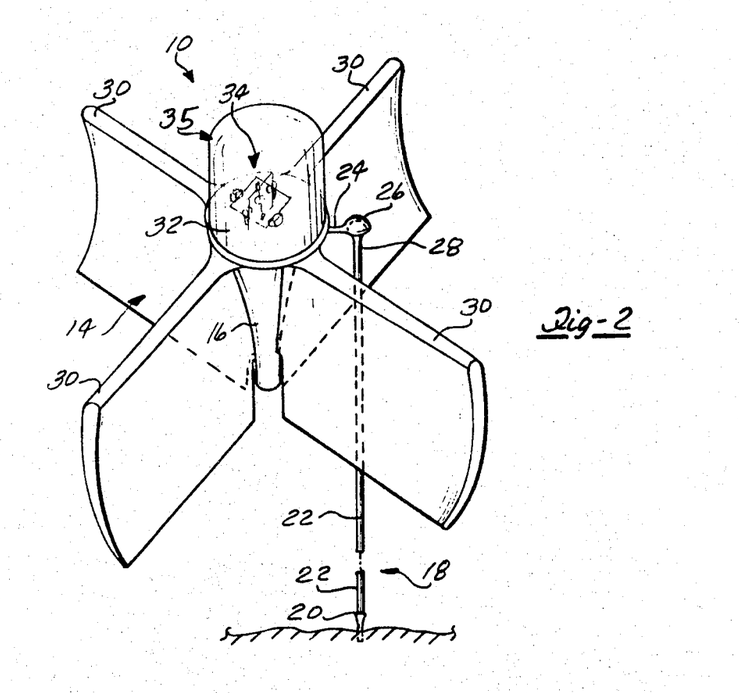
FIG. 2 is a perspective view of the mechanism illustrated in FIG. 1.

Referring now to the drawing, and to FIGS. 1 and 2 in particular, there is illustrated a mechanism 10 for generating power from wave motion on a body of water 12, such as an ocean.

The mechanism 10 includes a buoyant body 14 which is adapted to float on the surface of the body of water 12 and to be partially immersed therein. The buoyant body 14 is also adapted for pivotal or rocking movement in response to waves impinging upon the surface thereof along one or more particular axes.

The buoyant body 14 in one embodiment is in the form of a floatable buoy 16 which has an exponentially curved shape. The buoy 16 includes means 18 for anchoring the buoy 16 to the bottom floor of the body of water 12. In the embodiment illustrated in FIG. 1, the connecting means 18 comprises a chain or cable 19 which is connected via an anchor 20 to the floor of the body of water 12.

In a second embodiment, illustrated in FIG. 2, the connecting means 18 includes an elongated rigid rod or pipe 22 which is connected via an anchor 20 to the floor of the body of water 12. An elongated arm 24 is secured to and extends from the buoy 16 and has its outermost end formed in a socket 26 which is adapted to receive a ball portion 28 formed at the upper end of the rod 22. In this embodiment, the buoy 16 is readily pivoted in a back and forth motion along either of its principal axes via the ball and socket 28 and 26. Furthermore, the ball and socket 28 and 26 permit the up and down bobbing motion commonly experienced in shallow coastal waters to be similarly converted into pivotal motion of the buoy 16.

Although the buoyant body 14 has been illustrated and described in one embodiment of consisting of a floatable buoy 16, other types of buoyant bodies are also suited for use in the present invention and include barges or other floatable water craft as will be described in greater detail hereafter. Furthermore, although means for anchoring the buoyant body in one position has been described, it will be understood that the mechanism 10 of the present invention functions in the same manner even if free floating, i.e., not anchored in one position.

A plurality of outward extending vanes or arms 30 extend outward and are joined to the buoy 16. Each of the vanes 30 has a substantially hydrofoil or propeller blade-shaped cross sectional configuration to maximize the pressure gradient exerted on the vanes 30 by the water. The vanes 30 convert the energy of the waves into kinetic energy of the buoy 16 and cause it to move in pendulum-like motions. Preferably, four equally-spaced vanes 30 are connected to the buoy 16, with opposed vanes having symmetrical cross sectional configurations.

The upper portion of the buoy 16 is formed in a flat planar base configuration 32 which acts as a platform or mounting base for a gyro-wave energy transducer, shown generally by reference number 34. A sealing means 35 in the form of a domed housing is hermetically and releasably mounted to the base portion 32 of the buoy 16 to protect the gyro-wave energy transducer 34 mounted therein from the harsh and debilitating effects of salt water.

Figure 3:
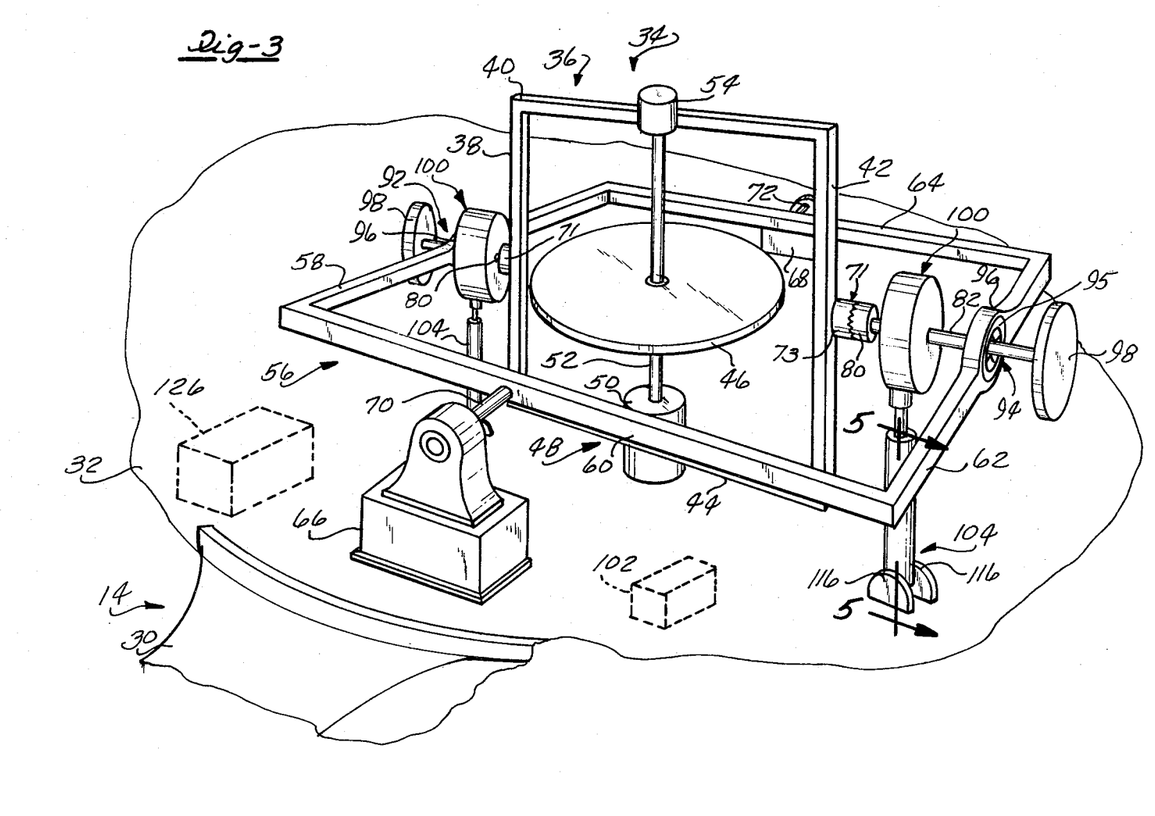
FIG. 3 is a perspective view of the gyro-wave energy transducer shown generally in FIG. 2.

As noted above, the mechanism 10 also comprises a gyro-wave energy transducer 34 as shown in FIG. 3. In general, the gyro-wave energy transducer 34 includes:

(a) a gimbal including first and second frames 36 and 56, respectively, with the first frame 36 being pivotally mounted to the second frame 56 for rotation about a first axis and the second frame 56 being mounted to the buoyant body 14 for rotation about a second axis perpendicular to the first axis;

(b) a gyroscope 46 mounted to the first frame 36 for rotation about a third axis perpendicular to the first and second axes;

(c) means 48, coupled to the gyroscope 46, for maintaining the gyroscope 46 at a controlled rotational velocity;

(d) means 104, for transferring torque of one of the first and second frames 36 and 56 to the gyroscope 46 about an axis that is perpendicular to that of the gyroscope 46 resulting in rotation of the other of the first and second frames 36 and 56;

(e) means, responsive to relative rotation of the first and and second frames, for generating electrical power;

(f) electrical power storage means 102, connected to the generating means and the means for maintaining the gyroscope rotational velocity, for storing and releasing electrical power; and (g) means, responsive to the time rate of change of current from the generating means and operatively coupled to the means for maintaining the rotational velocity of the gyroscope, for controlling the rotational velocity of the gyroscope to maintain the maximum power output from the generating means.

As noted above, the gimbal comprises a first planar frame 36 which include four leg or strut sections 38, 40, 42 and 44 arranged in a substantially square configuration. The first frame 36 is adapted to be pivotally mounted to the second frame 56 for rotational movement about a first axis extending between the centers of side legs 38 and 42. Further, the first frame 36 is preferably oriented in a substantially vertical position when in a static or rest condition.

The gimbal also includes a second planar frame 56 which is pivotally mounted to the buoyant body 14 for rotational movement about a second axis perpendicular to the axis of rotation of the first frame 36. The second frame 56 includes four leg or strut sections 58, 60, 62 and 64, which are arranged in a planar square configuration.

The second frame 56 is pivotally mounted to the buoyant body 14 by means of spaced pillow blocks 66 and 68 mounted on the base 32 of the buoyant body 14 which rotatably receive shafts 70 and 72, respectively, integrally connected to the legs 60 and 64 of the second frame 56. The pillow blocks 66 and 68 define the axis of rotation for the second frame 56. Although not shown, suitable bearings or other means of shaft support are mounted within the pillow blocks 66 and 68 to rotatably support the shafts 70 and 72 extending outward from the legs 60 and 64. Further, stops, not shown, are provided to limit the amount of angular rotation of the first and second frames 36 and 56 to between 30° and 40° of angular rotation to prevent damage thereto.

An inertia storage device 46, such as a spinning wheel or gyroscope, is mounted to the first frame 36 for rotation about an axis through its center. The gyroscope 46 is situated in the the plane of the first frame 36 with its axis of rotation positioned perpendicular to the axes of rotation of the first and second frames 36 and 56. For the configuration of the gyroscope 46, any body of revolution, such as a disc, ring, torus, each preferably symmetrically shaped, may be used to practice the present invention.

Means 48 are provided for maintaining the gyroscope 46 at a controlled rotational velocity. In a preferred embodiment, the means 48 for driving the gyroscope 46 comprises a motor/generator 50 which is mounted to leg 44 of the first frame 36. The output shaft 52 of the motor generator 50 extends through and is rigidly joined to the gyroscope 46 for affecting rotation of the gyroscope 46. The opposed end of the output shaft 52 is received in bearings mounted in a retainer 54 affixed to the leg 40 of the first frame 36. The motor/generator 50 drives the gyroscope 46 at a controlled rotational velocity and is also utilized, as described hereafter, to extract kinetic energy from the gyroscope 46 and convert it into usable electrical power.

The mechanism 10 of the present invention further includes means, operatively coupled to one of the first and second frames 36 and 56, for generating electrical power in response to the relative rotational motion of one frame resulting from the interaction of the gyroscope 46 and waves impinging upon the buoyant body 14. In general, the generating means includes one or more electrical generators, means for directionally coupling one of the freames to the generator and transmission means for increasing the amount of angular rotation of the one frame which is input to the electrical generator.

In the preferred embodiment of the present invention, the generating means includes first and second electrical generators 92 and 94. The generators 92 and 94 are formed with shafts extending outward from the legs 38 and 42 of the first frame 36 and fitted with a rotor or armature at the end thereof which is disposed within a generator housing or stator 95 that is fitted to the second frame 56 so as to convert rotational movement of the first frame 36 into electrical power, as described in greater detail hereinafer.

Figure 4:
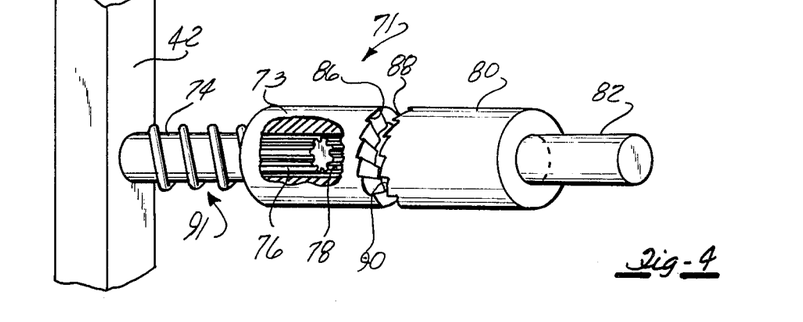
FIG. 4 is a partial enlarged view of the unidirectional coupling means shown generally in FIG. 3.

Referring briefly to FIG. 4, there is illustrated means, denoted in general by reference number 71, for unidirectionally coupling the first frame 36 to one of the generators, such as generator 94, such that only rotation of the first frame 36 in a first direction, i.e., counter-clockwise, will be transmitted to the generator motor to produce usable electrical current. In the preferred embodiment, a first and second unidirectional coupling means 71 are connected on opposed sides of the first frame 36 and mounted for reverse or opposed operation such that rotation of the firt frame 36 in a counter-clockwise direction will be transformed into rotation of the armature within the generator 94 to produce usable electrical current therefrom and movement of the first frame 36 in a second, clockwise direction will result in rotation of the corresponding armature causing current to be produced by the other generator 92.

The unidirectional coupling means 71 is in the form of a ratchet coupling which includes a drive member 73 which is keyed to a drive shaft 74, such that it rotates with the shaft 74 and can slide back and forth on the same. The shaft 74 extends outward from one of the side legs of the first frame 36, such as side leg 42. The drive shaft 74 has a plurality of external splines 76 formed at the outward end thereof which engage correspondingly formed internal splines 78 in the drive member 73. A driven member 80 of substantially cylindrical form has an integrally connected put shaft 82 extending outward therefrom. The mating faces 86 and 88 of the drive and driven members 73 and 80 are formed in a plurality of circumferential teeth 90 or steps around the entire mating surfaces thereof. The teeth 90 are formed such that the teeth 90 on the drive member 73 will engage the corresponding teeth 90 on the driven member 80 when the first frame 36 and drive member 73 rotate in a counter-clockwise direction, for example, but will slip or slide past the mating teeth 90 in the driven member 80 when the frame 36 and the drive member 73 rotate in the opposed, clockwise direction. Biasing means 91 in the form of a coil spring is disposed around the drive shaft 74 and abuts the drive member 73 urging the drive member 73 into engagement with the driven member 80; but allowing the drive member 73 to slide past the driven member 80 when rotated in a clockwise direction.

As noted above, the teeth 90 on the mating surfaces of the drive and driven members 73 and 80, respectively, are reversely configured on the opposed unidirectional coupling means 71 attached to the opposite leg 38 of the first frame 36 so as to operatively connect the first frame 36 to the other generator 92 upon rotational movement of the first frame 36 in a second clockwise direction.

Transmission means 100, FIG. 3, are provided between the first frame 36 and the generators 92 and 94 for stepping up or increasing the amount of angular rotation of the frame 36 which is input to the generators 92 and 94. The transmission means 100 may be of any suitable construction, such as one or more spur gears engaging small pinion gears to step up the angular rotation of the frame 36 from between 10 and 100 times to 1 to thereby improve the output efficiency of the gryo-wave energy transducer 34.

As shown in FIG. 3, the generating means of the preferred embodiment of the present invention is in the form of first and second generators 92 and 94. A suitably formed winding is disposed around the outermost end of the shaft 82 connected to the driven member 80 to form a rotor or armature. The armature is disposed within a corresponding ring of magnetic material 95 disposed within an enlarged portion 96 in a leg of the second frame 56 to form a conventional generator which produces electrical power upon rotation of the armature attached to the shaft 82.

As shown in FIG. 3, the shafts 82 extending outward from the driven members 80 are elongated so as to pass completely through the enlarged portions of the legs 58 and 62 of the second frame 56. Suitably formed flywheels 98 are keyed and firmly secured to the ends of the shafts 82.

Although suitably formed electrical generator means may be mounted in opposed legs of the second frame 56 in a similar manner as described above, the need for two additional generators and associated unidirectional coupling means and transmission means can be eliminated by utilizing means 104 for transferring torque of the second frame 56 to the gyroscope 46 which results in rotational movement of the first frame 36. Preferably, the transferring means 104 is in the form of suitably formed biasing means, such as coil springs.

Figure 5:
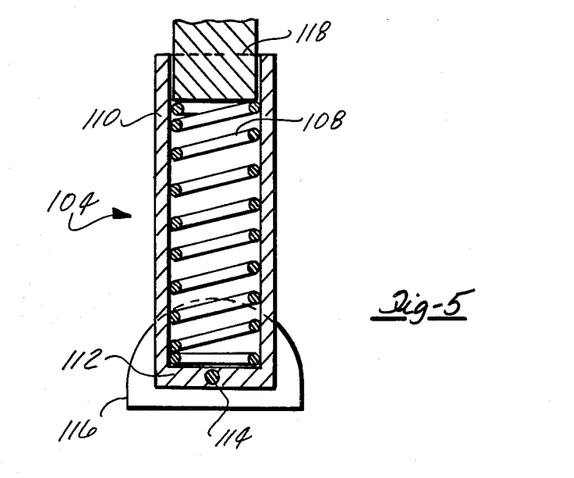
FIG. 5 is a cross-sectional view, generally taken along line 5—5 in FIG. 3.

As shown in greater detail in FIG. 5, each biasing means comprises a coil spring 108 which is disposed within a housing or guideway 110. The guideway 110 is pivotally connected to the base portion 32 of the buoyant body 14 at one end and the second frame 56 or the housing of the transmission means 100.

The coil spring 108 is mounted within the cylindrical, hollow housing 110 which has a seat 112 formed at the base thereof against which the bottom end of the spring 108 abuts. A pair of spaced flanges 116 connected to the buoyant body 14 are spaced along opposite sides of the housing 110 and a pivot pin 114 extends through the flanges 116 and seat 112 to pivotally connect the housing 110 at its bottom end to the buoyant body 14. A guide rod 118 slidingly engages the upper end of the housing 110 and abuts the upper end of the spring 108. The guide rod 118 is secured or joined to the housing of the transmission means 100, as shown in FIG. 3, to connect the upper end of the biasing means 104 to the gyro-wave energy transducer 34.

In operation, when a wave impinges upon the buoyant body 14 in such a manner so as to pivot or rock the buoyant body 14 about an axis parallel to any diametral axis of the gyroscope 46 and perpendicular to its axis of rotation, the change in angular orientation of the base 32 of the buoyant body 14 will be resisted by the angular momentum of the gyroscope 46 which resists changes in its orientation. Thus, among all possible modes of pivoting motion of the buoyant body 14, referred therein as pendulum motions, two modes exist in the form of principal rotation about an axis parallel to the pivoting axis of the second frame 56 and about an axis parallel to the pivoting axis of the first frame 40. All other oscillation modes are the resultant motions of the above referred specific modes.

Thus, if the buoyant body 14 rocks about an axis, parallel to the centerline of shafts 70 and 72, the second frame is urged by the forces of springs 108 to follow the buoy's pendulum motion, thereby urging the first frame 36 to follow likewise and forcing a precession of the gyroscope 46 about the pivotal axis of the first frame 36 causing the frame 36 to rotate relative to the second frame 56. This is called mode one. If the buoyant body 14 rocks about the pivotal axis of the first frame 36, the second frame 56 is urged by reaction forces at pillow blocks 66 and 68 to oscillate relative to the first frame 36. The generator moments drag the first frame 36 in its path, causing the gyroscope 46 to precess about the pivotal axis of the first frame, the result of which is a rotational motion of the second frame 56 about its pivotal axis and thereby compressing and extending springs 108. This is called mode two. Rocking motions of the buoyant body 14 about any other axis will result in motion configurations of the gyro-wave energy transducer 34 that are combinations of the two oscillation modes as discussed above. Therefore, any rocking motion of the buoyant body 14 produces necessarily relative motions between first frame 36 and second frame 56 that are rectified by means of the ratchet couplings 71 and yield one complete revolution of the output shaft for several oscillation cycles. The transmission means 100 is employed to amplify the angular displacements of the output of the ratchet couplings 71 by an appropriate ratio. The rotations of the output shafts 82, having centerlines that coincide with the pivotal axis of the first frame 36, revolve the generator rotor element relative to the generator housing element or stator that is embedded in the second frame 56. This action generates electrical current.

Electrical power storage means 102 in the form of a storage battery is mounted on the buoyant body 14 as shown in FIG. 3. The battery 102 is suitably connected by leads or wires, not shown, to the motor/generator 50 for supplying power to the motor/generator 50 for driving the gyroscope 46 and for extracting kinetic energy therefrom in the form of electrical current.

Further, the battery 102 is connected to the generators 92 and 94 for storing the electrical current generated thereby. In this manner, the generated power may be utilized to provide power for equipment, such as beacons, lights, radio transmitters, etc., which are mounted on the buoyant body 14. Alternately, the generated power may be transmitted directly to any remote electrical utilization device.

Figure 6:
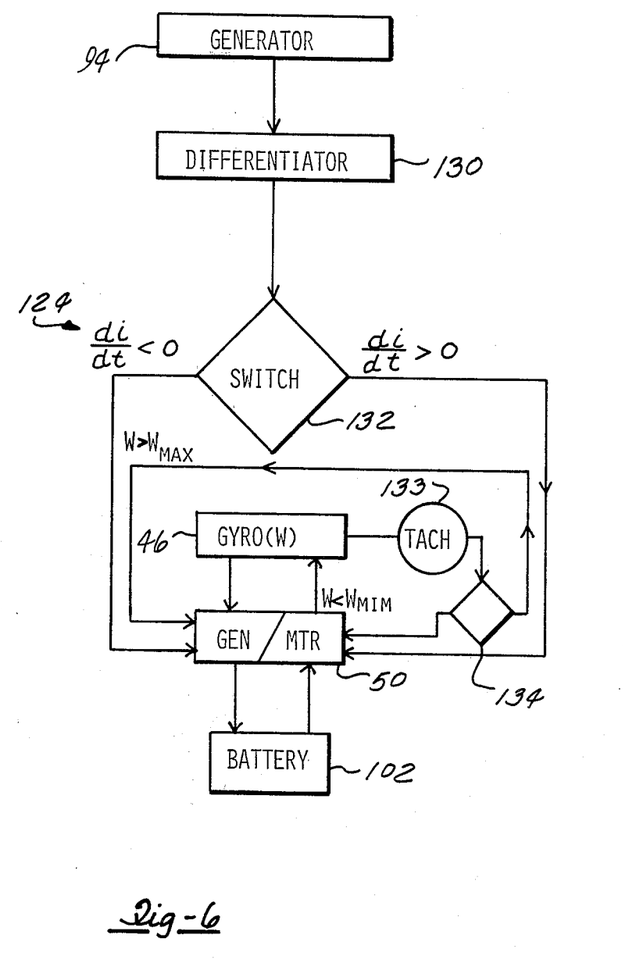
FIG. 6 is a block and flow diagram illustrating the means for controlling the rotational velocity of the gyroscope of the present invention.

Referring now to FIG. 6, there is shown a block and flow diagram of a means 124 for controlling the rotational velocity of the gyroscope 46 so as to maintain the power generated at a maximum value in response to the amplitude of wave motion impinging upon the buoyant body 14. The controlling means 124, which may be implemented by any suitable electronic or electrical circuitry and disposed within a housing 126 mounted on the buoyant body 14, includes a differentiator 130 in the form of a conventional differentiating amplifier which is connected to the output of one or both of the generators 92 and 94. The differentiator 130 provides an indication of the time rate of change of the output current from the generator, such as generator 94.

First and second switches 132 are connected to the output of the differentiator 130. The first switch 132 is responsive to the output of the differentiator 130 when the rate of change of the output current from the generator 94 is decreasing or is less than zero and is operative to connect the generator of the motor/generator unit 50 to the gyroscope 46 to extract kinetic energy therefrom so as to decrease the angular velocity of the gyroscope 46. This has the effect of reducing the time rate of change of the current to zero which is an indication of maximum power generation. The second switch 132 is responsive to the time rate of change of the generator output current when such rate of change is increasing or is greater than zero. In this mode, the second switch 132 energizes the motor of the motor/generator unit 50 so as to increase the angular velocity of the gyroscope 46 and reduce the time rate of change of the current to zero, again indicating maximum power output. In connecting the gyroscope 46 to the generator or motor of the motor/generating unit 50, the power is directed to or from the energy storage means or battery 102 so as to convert the kinetic energy in the gyroscope 46 into electrical energy which is stored within the battery 102 or to remove storage power from the battery 102 to drive the motor 50 and thereby increase the angular velocity of the gyroscope 46.

A tachometer 133 is operatively connected to the gyroscope 46 for providing an indication of the amount of angular rotation of the gyroscope 46. A two position switch 134 is connected to the tachometer 133 and is responsive to the rotational speed of the gyroscope 46 so as to energize the motor 50 if the rotational velocity of the gyroscope 46 is below a predetermined minimum value and to energize the generator 50 to extract kinetic energy from the gyroscope 46 if the rotational velocity of the gyroscope 46 is above a predetermined maximum value to thereby decrease its rotational velocity. In this manner, the rotational velocity of the gyroscope 46 is maintained within prescribed design limits.

Figure 7:
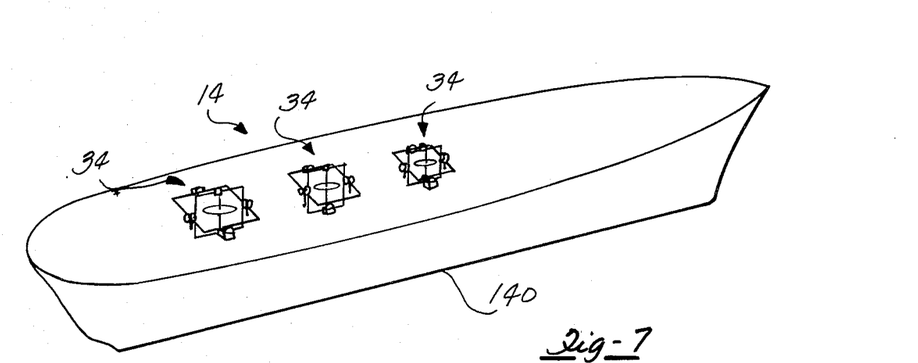
FIG. 7 is a pictorial representation of a plurality of identical gyro-wave energy transducers mounted on a buoyant body constructed in accordance with the teachings of another embodiment of the present invention.

Referring now to FIG. 7, there is shown an alternate embodiment of the buoyant body 14. In this embodiment, the buoyant body 14 is in the form of a barge or large floatable water craft 140 which is floating on the surface of the body of water 12 and is adapted for pivotal rocking movement in response to waves impinging upon the sides thereof. A plurality of identically formed gyro-wave energy transducers 34 are mounted on the top surface of the barge 140 and function in the identical manner as that described above with respect to the floatable buoy 16. The plurality of gyro-wave energy transducers 34 may be coupled together to transmit large amounts of electrical power via transmission lines to electrical energy utilization devices or networks.

Figures 8, 9:
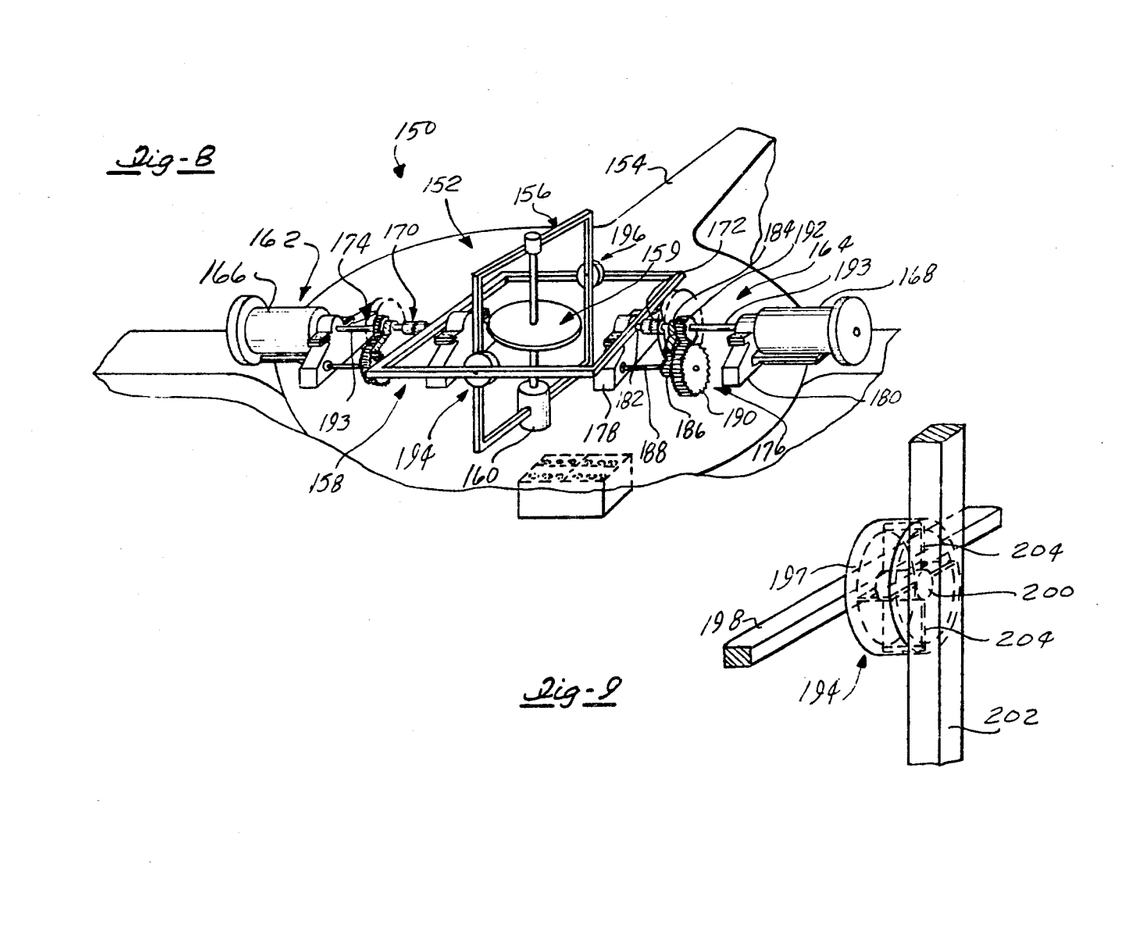
FIG. 8 is a perspective view of another embodiment of the gyro-wave energy transducer.
FIG. 9 is a partial, enlarged view of the transferring means, shown generally in FIG. 8 and constructed in accordance with the teachings of another embodiment of the present invention.

Referring now to FIG. 8, there is illustrated a mechanism 150 for generating power from wave motion occurring on a body of water constructed according to the teachings of another embodiment of the present invention. The mechanism 150 includes a gyro-wave energy transducer 152 which is adapted to be mounted on a suitable buoyant body 154, such as a floatable buoy or barge.

Since the function of the gyro-wave energy transducer 152 is identical to that described above for the gyro-wave energy transducer 34 and differs only in its construction, only a detailed description of the differences between the two gyro-wave energy transducers will be set forth below.

In general, the gyro-wave energy transducer 152 includes a gimbal comprising a first frame 156 and a second frame 158. The first frame 156 is pivotally connected to the second frame 158 and is adapted for rotational movement about a first axis. The second frame 158 is pivotally mounted to the buoyant body 154 for rotation about a second axis perpendicular to the first axis of rotation of the first frame 156. A gyroscope 159 including a suitable motor/generator unit 160 is mounted to the first frame 156 for rotation about a third axis perpendicular to the first and second axes.

Electrical generating means 162 and 164 in the form of first and second electrical generators are operatively coupled to the gimbal for generating electrical power in response to rotational movement of one of the first and second frames 156 and 158. In this embodiment, first and second electrical generators 166 and 168 are fixedly mounted to the platform of the buoyant body 154. In addition, first and second unidirectional coupling means 170 and 172, each of which is identically constructed as that described above and illustrated in FIG. 4, are operatively coupled between output shafts extending outward from opposed legs of the second frame 158 and the first and second electrical generators 166 and 168 for coupling rotational movement of the second frame 158 to the first and second electrical generators 166 and 168.

The unidirectional couplings 170 and 172 function to transmit opposite directions of rotation of the second frame 158 to the respective first and second electrical generators 166 and 168, in a manner identical to that described above with respect to FIG. 3.

First and second transmission means 174 and 176, meanwhile, function to step up or increase the amount of angular rotation of the second frame 158 which is input to the respective first and second electrical generators 166 and 168.

For purposes of clarity and better understanding of the present invention, a detailed description of one of the identically constructed transmission means 174 and 176 will be now described. As shown in FIG. 8, the transmission means 176 is mounted between first and second spaced pillow blocks 178 and 180 which are mounted on a platform of the buoyant body 154. An output shaft 182 is fixedly secured or journalled to a leg of the second frame 158 and has its first end rotatably supported in bearings mounted in the first pillow block 178. A first spur gear 184 is fixedly secured and co-axially disposed on the opposed end of the output shaft 182. The first spur gear 184 meshes with a first pinion 186 which is mounted on a rotatable shaft 188 supported within the pillow block 178. Also co-axially disposed on the rotatable shaft 188 is a second spur gear 190 having a substantially larger diameter and number of teeth than the first pinion gear 186. The second spur gear meshes with a smaller second pinion gear 192 which is mounted on a shaft 193 rotatably mounted to the electrical generator 168. In this manner, the transmission means 176 function to increase the rotational speed of the second frame 158 which is input to the electrical generator 168.

Although the above described step-up gear arrangement has been described and illustrated in conjunction with the present invention, it will be understood that any suitable type of step-up or transmission arrangement may be utilized to practice the present invention.

The mechanism 150 illustrated in FIG. 8 also includes transferring means 194 and 196 operatively connected between opposed legs of the first frame 156 and opposed corresponding legs of the second frame 158 for transferring torque and movement of the first frame 156 to torque and rotational movement of the second frame 158.

Referring now to FIG. 9, there is shown a partial, enlarged view of one of the identically constructed translating means, such as translating means 194. As shown therein, the translating means 194 comprises a circular housing having a thin outer wall 197 which is secured to one leg 198 of the second frame 158. An inner cylindrical member 200 is concentrically disposed within the outer circular member 197 and is fixedly secured to one leg 202 of the first frame 156. A plurality of resilient, planar members 204 extend between the inner and outer cylindrical members 197 and 200 and are joined thereto at their opposed ends. The resilient members 204 function to store potential energy caused by rotation of the first frame 156 relative to the second frame 158 and to convert the stored potential energy into kinetic energy such that the first frame 156 oscillates relative to the second frame about an axis along the centerline of cylindrical member 200.

Figure 10:
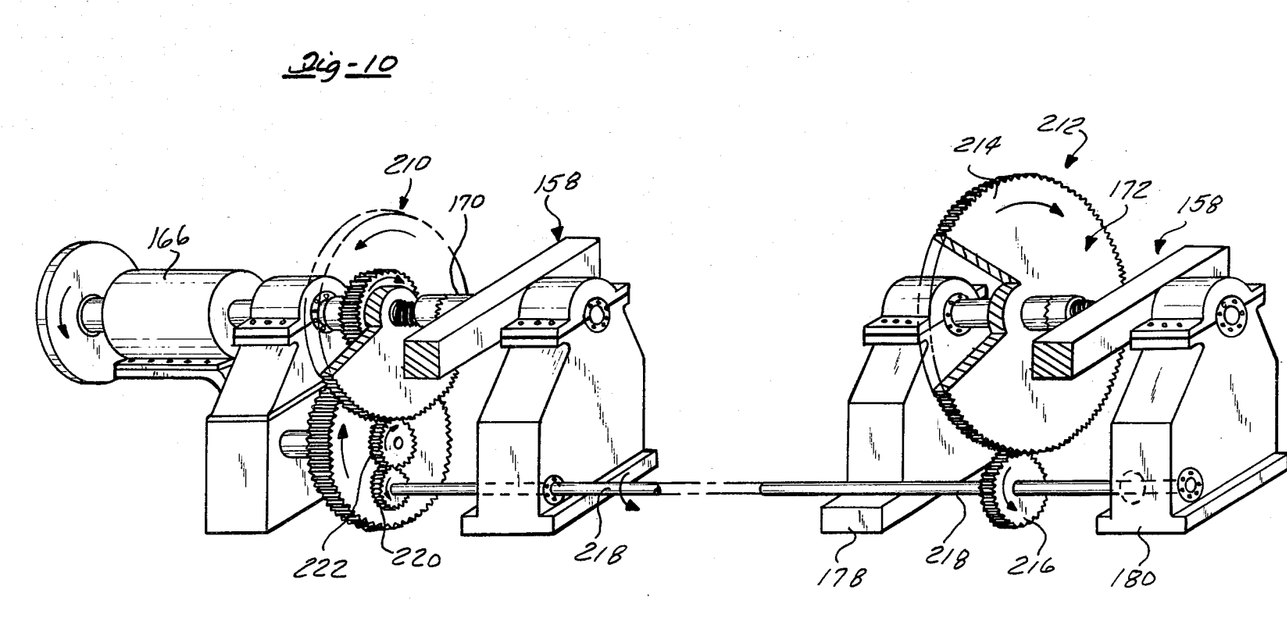
FIG. 10 is a partial, enlarged perspective view of another embodiment of the gyro-wave energy transducer.

Referring now to FIG. 10, there is shown yet another embodiment of the present invention which is similar to that described above and illustrated in FIG. 8. As this embodiment of the present invention differs only slightly from that illustrated in FIG. 8, only the differences between the two embodiments will be described in detail below. In this embodiment of the present invention the generating means comprises only a single electrical generator 166 which is associated with one leg of the second frame 158. First and second unidirectional coupling means 170 an 172 and first and second transmission means 210 and 212 are respectively associated therewith. As only a single electrical generator 166 is utilized in this embodiment of the present invention to generate power from rotational movement of the gimbal system, rotation of the second frame 158 in a particular direction must be transmitted to the transmission means operably coupled to the single electrical generator 166. Thus, the transmission means 212 comprises a single spur gear 214 which is fixedly secured to the rotatable shaft which is journalled to one leg of the second frame 158. The spur gear 214 meshes with a smaller pinion gear 216 which is supported on a rotatable shaft 218. The rotatable shaft 218 is rotatably mounted at one end to pillow block 180 and extends to the pillow block associated with the opposed transmission means 210. A second pinion gear 220 is fixedly secured or journalled to the opposed end of the shaft 218. The second pinion gear 220 meshes with the pinion gear 222 of the opposed transmission means 210 and functions to reverse the rotational movement of the transmission means 212 so as to cause a corresponding rotation of the transmission means 210 and thereby transmit rotation of the second frame 158 in both directions to the electrical generator 166.

In summary, there has been disclosed herein a unique mechanism for generating power from wave motion occurring on a body of water. The mechanism uniquely utilizes a gimbal system incorporating a spinning gyroscope which is mounted to a buoyant body floating in the body of water. The gimbal system operates to translate the pendulum-like motion of the buoyant body into rotational movement. The rotational movement of the gimbal is converted by means of electrical generators into usable electrical energy. The mechanism of the present invention is designed to efficiently convert substantially all of the potential and kinetic energy of the waves into usable electrical energy and is ideally suited for use in a large variety of applications as well as under different and continually changing wave fronts. Further, all of the operative components of the mechanism of the present invention, both mechanical and electrical, are hermetically sealed within a domed housing mounted on the buoyant body so as to be protected from corrosive effects of sea water. This results in compactness and significantly less maintenance for the mechanism of the present invention compared to similar prior art wave energy devices. Also, the mechanism of the present invention is ideally suited for use as a stand-alone power device for light buoys, etc., as well as an auxiliary power source for water vessels.

What is claimed is:

1. A mechanism for generating power from wave motion in a body of water comprising:
    a buoyant body adapted to float in said body of water and be partially immersed therein, said buoyant body being pivotally movable in response to said wave motion;
    a gyro-wave energy transducer mounted to said buoyant body, said gyro-wave energy transducer comprising:
    a gimbal including first and second frames, said first frame being pivotally mounted to said second frame for rotation about a first axis, said second frame being pivotally mounted to said buoyant body for rotation about a second axis perpendicular to said first axis;

a gyroscope mounted to said first frame for rotation about a third axis perpendicular to said first and second axes;

means for transferring rotational movement of one of said first and second frames to rotational movement of the other of said first and second frames;

means, responsive to the rotation of said other of said first and second frames, for generating electrical power;

means, coupled to said gyroscope, for maintaining said gyroscope at a controlled rotational velocity;

electrical power storage means, connected to said generating means and to said gyroscope rotational velocity maintaining means, for storing and releasing electrical power; and means, responsive to the time rate of change of current from said generating means and operatively coupled to said gyroscope rotational velocity maintaining means, for controlling the rotational velocity of said gyroscope to maintain maximum power output from said said generating means.

2. The mechanism of claim 1 wherein the generating means includes a first electrical generator coupled to one of the first and second frames such that rotation of said one of said first and second frames causes electrical current to be produced by said first electric generator.

3. The mechanism of claim 2 wherein the generating means further includes the first and second means, connected to opposed sides of the one of the first and second frames, for unidirectionally coupling said generating means to said one frame such that said first unidirectional coupling means couples rotation of said one frame in a first direction only to said generating means and said second unidirectional coupling means couples rotation of said one frame in an opposed second direction only to said generating means.

4. The mechanism of claim 3 wherein the generating means further includes first and second transmission means, respectively connected to the first and second unidirectional coupling means, for increasing the amount of angular rotation of the one frame which is input to the generating means.

5. The mechanism of claim 1 wherein the electrical power storage means comprises a battery mounted on the buoyant body.

6. The mechanism of claim 1 wherein the gyroscope rotational velocity maintaining means includes a motor/generator mounted to the first frame and coupled to the gyroscope.

7. The mechanism of claim 3 wherein the first and second unidirectional coupling means each comprise:

a drive shaft connected to the one frame and extending outward therefrom;

a drive member operatively joined to said drive shaft for rotation therewith, said drive member being slidable along the length of said drive shaft;

a driven member, said driven member having an integral output shaft extending outward therefrom; and means for biasing said drive and driven members into engagement;

said drive and driven members having mating surfaces configured to be coupled together for simultaneous rotation upon rotation of said one frame in a first direction and to slide over each other when said one frame rotates in a second opposed direction such that rotation of said drive shaft caused by rotation of said one frame results in rotation of said output shaft of said driven member only upon rotation of said one frame in one direction.

8. The mechanism of claim 1 wherein the buoyant body comprises a floatable buoy adapted to float on the surface of the body of water with a portion thereof submerged beneath said surface; said buoy defining a platform for the gyro-wave energy transducer; and a plurality of circumferentially spaced vanes joined to and extending outward from said buoy.

9. The mechanism of claim 8 where there are at least four equally spaced vanes.

10. The mechanism of claim 8 wherein opposing vanes have symmetrical propeller blade-shaped cross sectional configuration.

11. The mechanism of claim 8 further including means for attaching the buoy to the bottom floor of the body of water.

12. The mechanism of claim 11 wherein the attaching means comprises:

an elongated rod adapted to be anchored to the bottom floor of the body of water; and ball and socket means for coupling the buoy to said rod to permit rotary and vertical deflectional movement of said buoy with respect to said rod.

13. The mechanism of claim 1 wherein the buoyant body comprises a floatable water craft adapted to be anchored in a fixed position and be pivotally movable in response to waves impinging thereon.

14. The mechanism of claim 13 further including a plurality of identical gyro-wave energy transducers mounted upon the floatable water craft.

15. The mechanism of claim 1 wherein the gyro-wave energy transducer is mounted within a hermetically sealed housing disposed upon the buoyant body.

16. The mechanism of claim 1 wherein the means for controlling the rotational velocity of the gyroscope comprises:

differentiator means, coupled to the generating means, for determining the time rate of change of the output current of said generator means;

first switch means, responsive to said differentiator means when the time rate of change of the output current from said generating means is decreasing, for coupling the gyroscope to the gyroscope rotational velocity maintaining means to decrease the angular velocity of said gyroscope; and second switch means, responsive to said differentiator means when the time rate of change of said output current from said generating means is increasing, for coupling said gyroscope to said gyroscope rotational velocity maintaining means to increase the angular velocity of said gyroscope.

17. The mechanism of claim 4 wherein the first frame is oriented in a substantially vertical position when in a static condition;

the gyroscope is mounted for rotation in a substantially horizontal plane when in a static condition; and the second frame is oriented in a substantially horizontal position when in a static condition.

18. The mechanism of claim 17 wherein the generating means includes first and second generators;

said first frame having outwardly extending drive shafts integrally formed with opposed vertical legs thereof;

the first and second unidirectional coupling means and the first and second transmission means respectively and unidirectionally coupling rotation of the drive shafts connected to said first frame to rotation of the armatures of said first and second generators for producing electrical power upon rotation of said first frame in first and second opposed directions.

19. The mechanism of claim 18 wherein the transferring means comprises first and second biasing means for coupling the motions of the second frame with those of the buoyant body.

20. The mechanism of claim 19 wherein the biasing means comprises coil springs disposed substantially vertically from the buoyant body and connected at one end to said buoyant body and to the second frame at the opposed end.

21. The mechanism of claim 17 wherein the generating means includes first and second electrical generators mounted to the buoyant body;
first and second drive shafts extending outward from opposed horizontally extending legs of the second frame;
the first and second unidirectionally coupling means and the first and second transmission means respectively coupling rotation of the first and second drive shafts connected to said second frame to said first and second electrical generators; and
the transferring means being disposed between opposed legs of the first frame and the corresponding opposed legs of said second frame for transferring rotational movement of said first frame to rotational movement of said second frame.

22. The mechanism of claim 21 wherein the translating means comprises torsion springs.

23. The mechanism of claim 17 wherein the generating means includes a first electrical generator mounted to the buoyant body;
first and second output shafts connected and extending outward from opposed horizontally disposed legs of the second frame;
connecting means extending between and coupling the first and second transmission means;
means for reversing the direction of rotation of said second transmission means to correspond to the direction of rotation of said first transmission means;
said first and second unidirectional coupling means and said first and second transmission means respectively coupling rotation of said first and second output shafts connected to said second frame to said first generator for producing electrical power upon rotation of the first and second frame; and
wherein the transferring means is disposed between and connected to opposed spaced legs of the first frame and the corresponding legs of the second frame.

24. A gyro-wave energy transducer, adapted to be mounted to a platform disposed in a fluid body and pivotally movable in response to movements of said fluid body, for generating power from said movement of said fluid body, said gyro-wave energy transducer comprising:
a gimbal including first and second frames, said first frame being pivotally mounted to said second frame for rotation about a first axis, said second frame being pivotally mounted to said platform for rotation about a second axis perpendicular to said first axis;
a gyroscope mounted to said first frame for rotation about a third axis perpendicular to said first and second axes;
means for transferring rotational movement of one of said first and second frames to rotational movement of the other of said first and second frames;
means, responsive to the rotation of said other of said first and second frames, for generating electrical power;
means, coupled to said gyroscope, for maintaining said gyroscope at a controlled rotational velocity;
electrical power storage means, connected to said generating means and to said gyroscope rotational velocity maintaining means, for storing and releasing electrical power; and
means, responsive to the time rate of change of current from said generating means and operatively coupled to said gyroscope rotational velocity maintaining means, for controlling the rotational velocity of said gyroscope to maintain maximum power output from said generating means.

25. The gyro-wave energy transducer of claim 24 wherein the generating means includes a first electrical generator coupled to one of the first and second frames such that rotation of said one of said first and second frame causes electrical current to be produced by said first electric generator.

26. The mechanism of claim 25 wherein the generating means further includes the first and second means, connected to opposed sides of the one of the first and second frames, for unidirectionally coupling said generating means to said one frame such that said first unidirectional coupling means couples rotation of said one frame in a first direction only to said generating means and said second unidirectional coupling means couples rotation of said one frame in an opposed second direction only to said generating means.

27. The mechanism of claim 26 wherein the generating means further includes first and second transmission means, respectively connected to the first and second unidirectional coupling means, for increasing the amount of angular rotation of the one frame which is input to the generating means.

28. The mechanism of claim 27 wherein the generating means includes first and second generators;
said first frame having outwardly extending drive shafts integrally formed with opposed vertical legs thereof;
the first and second unidirectional coupling means and the first and second transmission means respectively and unidirectionally coupling rotation of the drive shafts connected to said first frame to rotation of the armatures of said first and second generators for producing electrical power upon rotation of said first frame in first and second opposed directions.

29. The mechanism of claim 28 wherein the transferring means comprises first and second biasing means for coupling the motions of the second frame with those of the buoyant body.

30. The mechanism of claim 29 wherein the biasing means comprises coil springs disposed substantially vertically from the buoyant body and connected at one end to said buoyant body and to the second frame at the opposed end.

31. The mechanism of claim 27 wherein the generating means includes first and second electrical generators mounted to the buoyant body;

first and second drive shafts extending outward from opposed horizontally extending legs of the second frame;

the first and second unidirectionally coupling means and the first and second transmission means respectively coupling rotation of the first and second drive shafts connected to said second frame to said first and second electrical generators; and the transferring means being disposed between opposed legs of the first frame and the corresponding opposed legs of said second frame for transferring rotational movement of said first frame to rotational movement of said second frame.

32. The mechanism of claim 31 wherein the transferring means comprises torsion springs.

33. The mechanism of claim 27 wherein the generating means includes a first electrical generator mounted to the buoyant body;

first and second output shafts connected and extending outward from opposed horizontally disposed legs of the second frame;

connecting means extending between and coupling the first and second transmission means;

means for reversing the direction of rotation of said second transmission means to correspond to the direction of rotation of said first transmission means;

said first and second unidirectional coupling means and said first and second transmission means respectively coupling rotation of said first and second output shafts connected to said second frame to said first generator for producing electrical power upon rotation of the first and second frames; and wherein the transferring means is disposed between and connected to opposed spaced legs of the first frame and the corresponding legs of the second frame.

* * * * *